Aug. 6, 1935.   H. P. KIRCHNER ET AL   2,010,025
FLOOR SURFACE
Filed Dec. 14, 1932
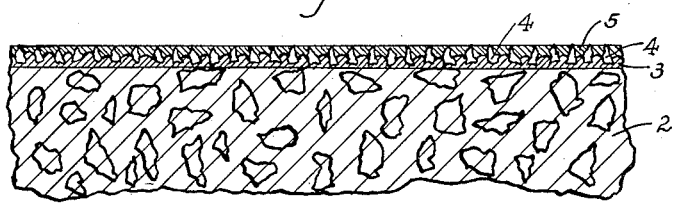
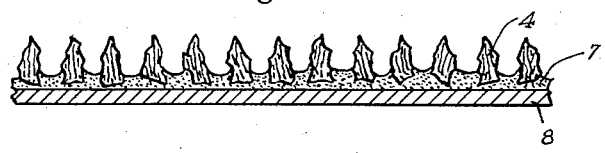
INVENTORS
HENRY P. KIRCHNER
RAYMOND C. BENNER
BY ROMIE L. MELTON
ATTORNEY Patented Aug. 6, 1935

2,010,025

UNITED STATES PATENT OFFICE 2,010,025

FLOOR SURFACE

Henry P. Kirchner, Raymond C. Benner, and Romie L. Melton, Niagara Falls, N. Y., assignors to The Carborundum Company, Niagara Falls, N. Y., a corporation of Pennsylvania Application December 14, 1932, Serial No. 647,240

8 Claims. (Cl. 94—3)

This application relates to the manufacture of floor tiles, artificial stone floors and the like.

In general, the application discloses methods of making floor surfaces with oriented granular surfaces which have unusual mechanical and artistic properties.

Artificial stone flooring, such as terrazzo flooring, can be made by arranging stone chips of variegated colors in a surface coating of unhardened cement. The arrangement of the stone chips can be such as to give pictorial effects or a recurring design, or can be simply an irregular distribution of colored chips which suggests conglomerate rock surfaces. After the cement has hardened, the surface of the floor is ground down to an approximately uniform level with polishing disks or rub bricks. In the case of ordinary terrazzo surfaces in which stone chips (of marble, for example) are used, the wear produced by the tread surfaces of shoes is comparatively rapid. This wear is greatest along certain lines of frequent travel so that the floor becomes worn and uneven along certain paths. This is a very undesirable result which greatly injures the appearance of these expensive floors. The rate of attrition depends not only on the character of the stone chips but also on the character of the cement which holds them together.

The present invention is concerned with the construction of non-slip floor surfaces which contain elongated granules of hard material held by cement in an oriented position. It is preferred that the granules be so oriented that their greater dimensions are substantially normal to the floor surface. However, elongated granular particles have been found to be effective when the granules were positioned so that their greater dimensions were at an angle of 45° to 90° with respect to the floor surface.

Granular particles intended for such use should be preselected so as to have one or two dimensions greater than their other dimensions, those having one large dimension being what might be called "splintery" while those having two dimensions greater than the third can be described as "platey". Grain of this character can be obtained, for example, by selecting certain portions of the product of a silicon carbide furnace which are naturally elongated (that is, splintery or platey) or by applying an air winnowing process to grain. The latter process is particularly applicable for the separation of elongated particles from grains which contain a relatively small proportion of elongated particles. The longest dimension of a granule may be called, for convenience, its major axis, although the granules which we use do not generally have exact geometrical symmetry about its longest dimension.

The present invention can be more clearly understood by reference to the accompanying drawing in which:

Figure 1 is a fragmentary section of flooring having an oriented granular surface of the type described in this application; and Figure 2 is a section through the granular coated web employed.

Figure 1 of the drawing shows a fragmentary section of a flooring made in accordance with the present invention. The floor foundation 2 is covered with a layer of cement 3, which in turn holds the elongated granules 4 with their major axes directed for the most part substantially normal to the surface of the floor. The granules are further supported by a second layer of cement 5, which fills a greater part of the space between the projecting granules 4. Obviously, this type of floor surface has a high coefficient of friction, permits very little slippage, and does not easily become clogged with debris to an extent which renders the surface smooth.

In order to properly position and distribute the granular particles in the surface of a floor, we use a previously coated web having the above described elongated granules 4 positioned thereon and secured by a suitable adhesive 7 in such a manner that their greater dimensions make an angle between 45° and 90° inclusive, with the web. Where it is desired to have the granules distributed on the floor in a pattern, such a pattern is first produced on the granular coated web preferably during the manufacture of said web.

The desired orientation of the elongated granular particles may be produced by suitably projecting said granules upwardly onto a downwardly facing adhesively coated web of paper, cloth or the like. The preferred process is briefly as follows: The adhesively coated web is passed through an electrostatic field with the adhesively coated side facing downwardly and over a feed belt carrying a supply of elongated granular particles into said field. As the granules enter the field they are charged electrically and caused to take a position with their long axes perpendicular to the feed belt and parallel to the lines of force of the electrostatic field. The action of the electrostatic forces then propels the granular particles toward the web where they are embedded, point out, in the adhesive.

The term "granular particles" as used in the present specification is defined as small pieces of hard material, such as abrasive grain, and of such size as to be readily attached to a web backing and retained thereto by a layer of adhesive.

In laying the floor, the granular sheet 8 is laid with the oriented granules 4 on the underside, on a suitable foundation 2, which has a coating of hardenable cement 3 in a fluid or plastic condition. The granular coated web is pressed or rolled so that the projecting ends of the granules become embedded in the cement 3. During this operation the granules are protected and held in place by the layer of hardened adhesive 7 which holds the granules to the web. After the cement 3 has hardened, the web 8 is removed by applying a solvent, for the adhesive 7, to the back of the web, for example, where glue is the adhesive, jets of steam or water (the latter preferably heated) are distributed over the web until the adhesive softens and the web can be removed from the floor. After the web is removed, the spaces between the grains formerly occupied by the adhesive 7, are filled with neat cement 5 or other material suitable for the purpose.

In certain instances it may be desirable to build up a floor surface by laying tile in a layer of plastic cement which covers a foundation of cemented aggregate. Where this is the case, each individual tile or segment would be provided with an oriented granular surface prior to the step of laying.

We have found that floors having a surface of oriented granular particles are superior to other types of terrazzo floors in that they possess a higher coefficient of friction which minimizes the danger of slippage. Another desirable feature lies in the fact that comparatively soft cement or resilient foundations can be provided with a hard surface composed of oriented granules which resists wear and at the same time retains a high coefficient of friction. Such floor surfaces, composed of a large number of oriented granules of a hard substance, such as silicon carbide, aluminum oxide, garnet, flint, and the like, resist abrasion and possess a longer useful life than the ordinary type of terrazzo floor.

Various artistic effects can be readily obtained by the use of grains of different colors or by patterns of different designs. Such effects are produced on the granular coated web, and do not cause any difficulties in the process of laying the floor.

While certain specific materials have been mentioned for the oriented granular coatings, other granular materials characterized by suitable toughness (and obtainable in forms having a pronounced major axis) can be used. The essential features on which this patent application is based are embraced in the compass of the following claims.

We claim:

1. An oriented granular floor surface in which most of the granules are elongated in character and have major axes disposed in a substantially vertical direction.

2. A floor with finely serrated surface comprising in combination a foundation of cemented aggregate, a cement covering for said foundation, and an oriented granular surface layer of elongated granules cemented to said covering, said oriented surface having most of its granules arranged in a substantially vertical direction.

3. An oriented granular floor surface having elongated abrasive granules distributed on a predetermined pattern, the most of said granules having their major axes disposed substantially normally to the surface of the floor.

4. The oriented granular floor surface described in claim 1 in which the projecting points of the oriented granules are reinforced with a strong sizing coating.

5. The process of producing an oriented granular floor surface comprising applying a layer of hardenable cement to a foundation, applying to the surface of said cement the grain side of a granular coated web having the granules oriented substantially perpendicular to the surface of the web and removing said web after the cement has hardened in contact with the granules.

6. The process of producing an oriented granular floor surface comprising applying a layer of hardenable cement to a foundation, applying to the surface of said cement the grain side of a granular coated web having the granules oriented substantially perpendicular to the surface of the web, rolling the back of said oriented granular coated web so as to firmly embed the oriented granules in the surface of said cement and removing the web material after the cement has hardened sufficiently to retain the embedded granules.

7. The process of producing an oriented granular floor surface comprising applying a layer of hardenable cement to a foundation, embedding in the surface of said cement the grain side of a granular coated web having the granules oriented substantially perpendicular to the web, removing the web after the cement has hardened sufficiently to retain the embedded granules and applying an additional layer of cement.

8. The process of producing an oriented granular floor surface comprising applying a layer of hardenable cement to a foundation, embedding in the surface of said cement the grain side of a granular coated web having the granules oriented substantially perpendicular to said web and attached thereto by means of a water soluble adhesive, applying a solvent of said adhesive to the back of said web after the cement has hardened sufficiently to retain the embedded granules and removing said web leaving the granules embedded in said cement and oriented with respect to the surface thereof.

HENRY P. KIRCHNER.
RAYMOND C. BENNER.
ROMIE L. MELTON.